March 17, 1970  W. A. WILLIAMSON ET AL  3,500,948
MATERIAL HANDLING DEVICE

Filed Oct. 3, 1967  4 Sheets-Sheet 1

INVENTORS
WILLIAM A. WILLIAMSON
ROBERT R. RABBITT
BY
ATTORNEY

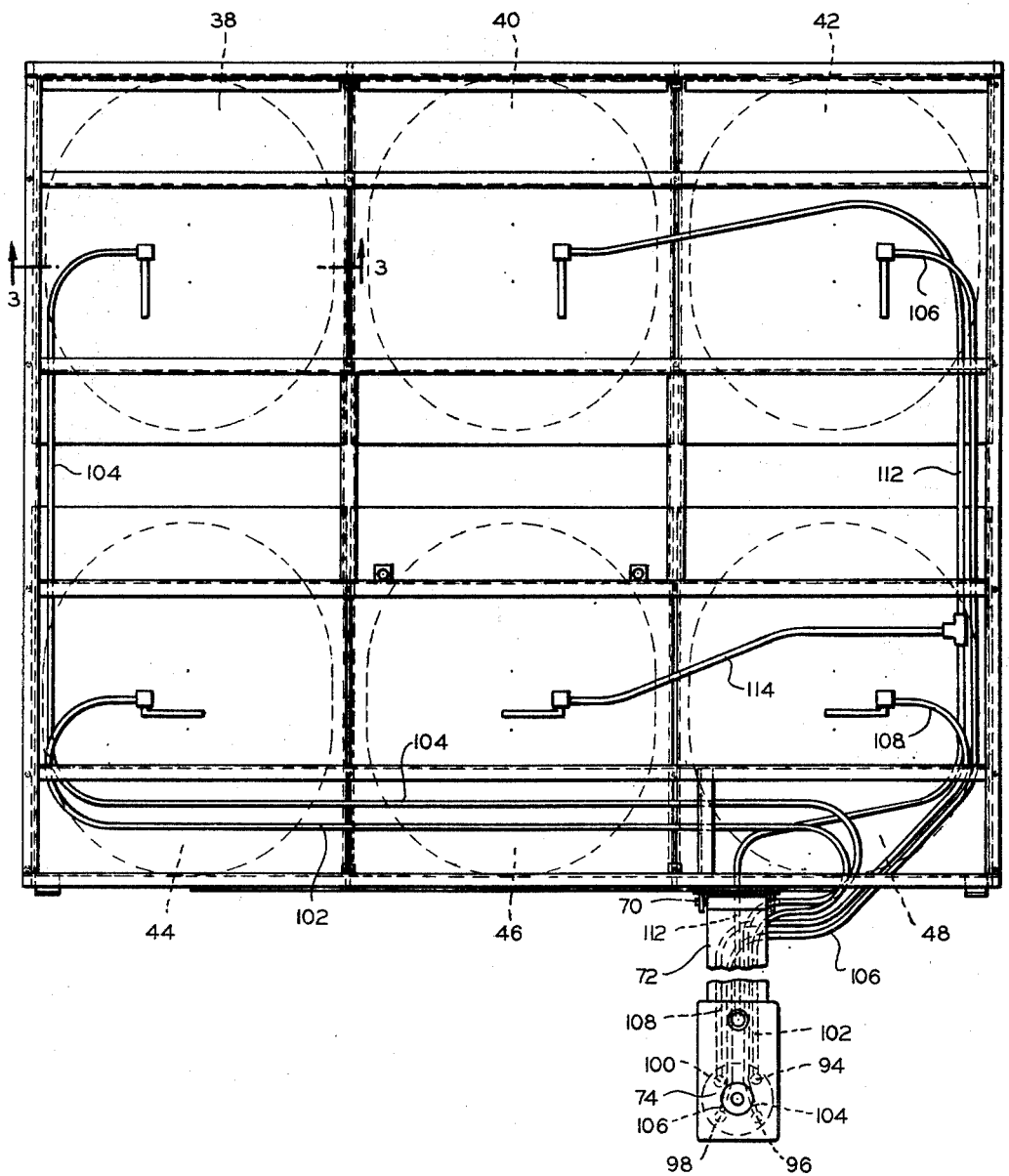

March 17, 1970 W. A. WILLIAMSON ET AL 3,500,948
MATERIAL HANDLING DEVICE
Filed Oct. 3, 1967 4 Sheets-Sheet 3
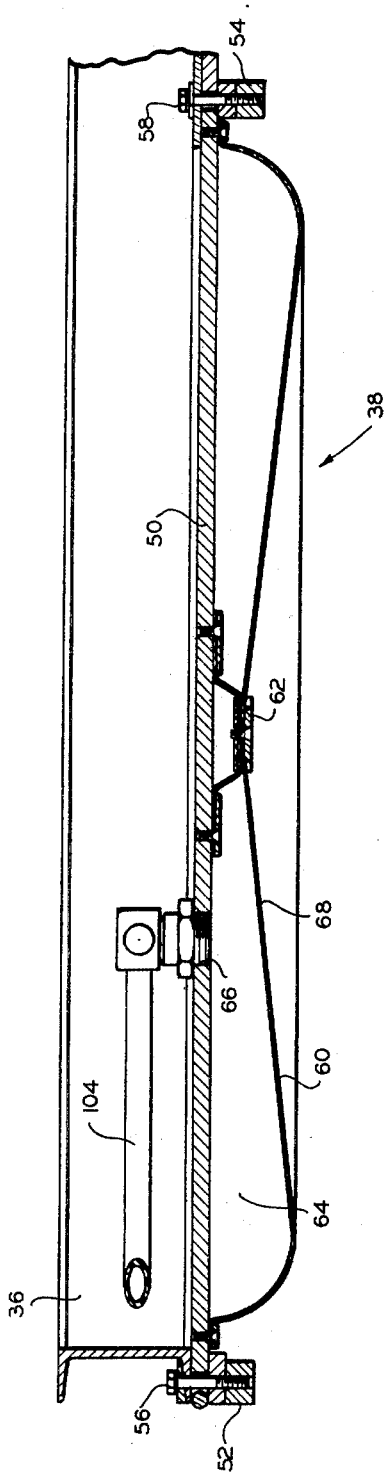
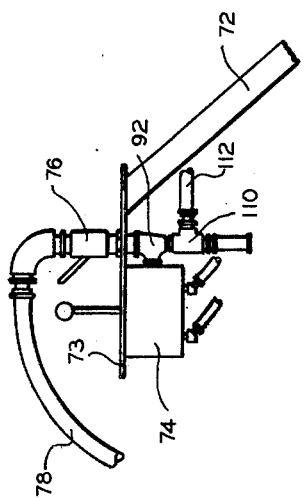
INVENTORS
WILLIAM A. WILLIAMSON
ROBERT R. RABBITT
BY
ATTORNEY INVENTORS
WILLIAM A. WILLIAMSON
ROBERT R. RABBITT
BY Robert H. Johnson
ATTORNEY United States Patent Office 3,500,948
Patented Mar. 17, 1970

3,500,948
MATERIAL HANDLING DEVICE
William A. Williamson and Robert R. Rabbitt, Battle Creek, Mich., assignors to Clark Equipment Company, a corporation of Michigan
Filed Oct. 3, 1967, Ser. No. 672,570
Int. Cl. B60v 1/10; B66f 3/34
U.S. Cl. 180—124           1 Claim

ABSTRACT OF THE DISCLOSURE

The combination of an industrial truck and a container handling pallet connected thereto. The pallet includes a frame to which six inflatable air pads are connected in generally rectangular relation, means for communicating the pads with a source of pressurized air and a valve for varying the flow of air to the corner pads.

BACKGROUND OF THE INVENTION

The field of art to which the invention pertains includes material handling devices, and more particularly special supporting devices therefor.

A principal object of our invention is to provide a material handling device with inflatable air pads and which can be easily operated to compensate for off-center loading on the device or for tilting the device.

Another object of our invention is to provide a low cost valve for controlling the flow of pressurized fluid to a plurality of air pads.

SUMMARY OF THE INVENTION

In carrying out our invention in a preferred embodiment thereof, we provide a support frame to the underside of which six inflatable air pads are connected in generally rectangular relation. Valve means are included for communicating the pads with a source of pressurized air, the valve means being operable to vary the flow of air to the corner pads.

The above and other objects, features and advantages of our invention will be more readily understood by persons skilled in the art when the following detailed description is taken in conjunction with the drawing.

BRIEF DESCRIPTION OF THE DRAWING

FIGURE 2 is a plan view of our invention,
FIGURE 3 is a cross section taken along the line 3—3 of FIGURE 2,
FIGURE 4 is an enlarged view of the flow control valve of our invention.

DESCRIPTION OF THE PREFERRED EMBODIMENTS

Figure 1:
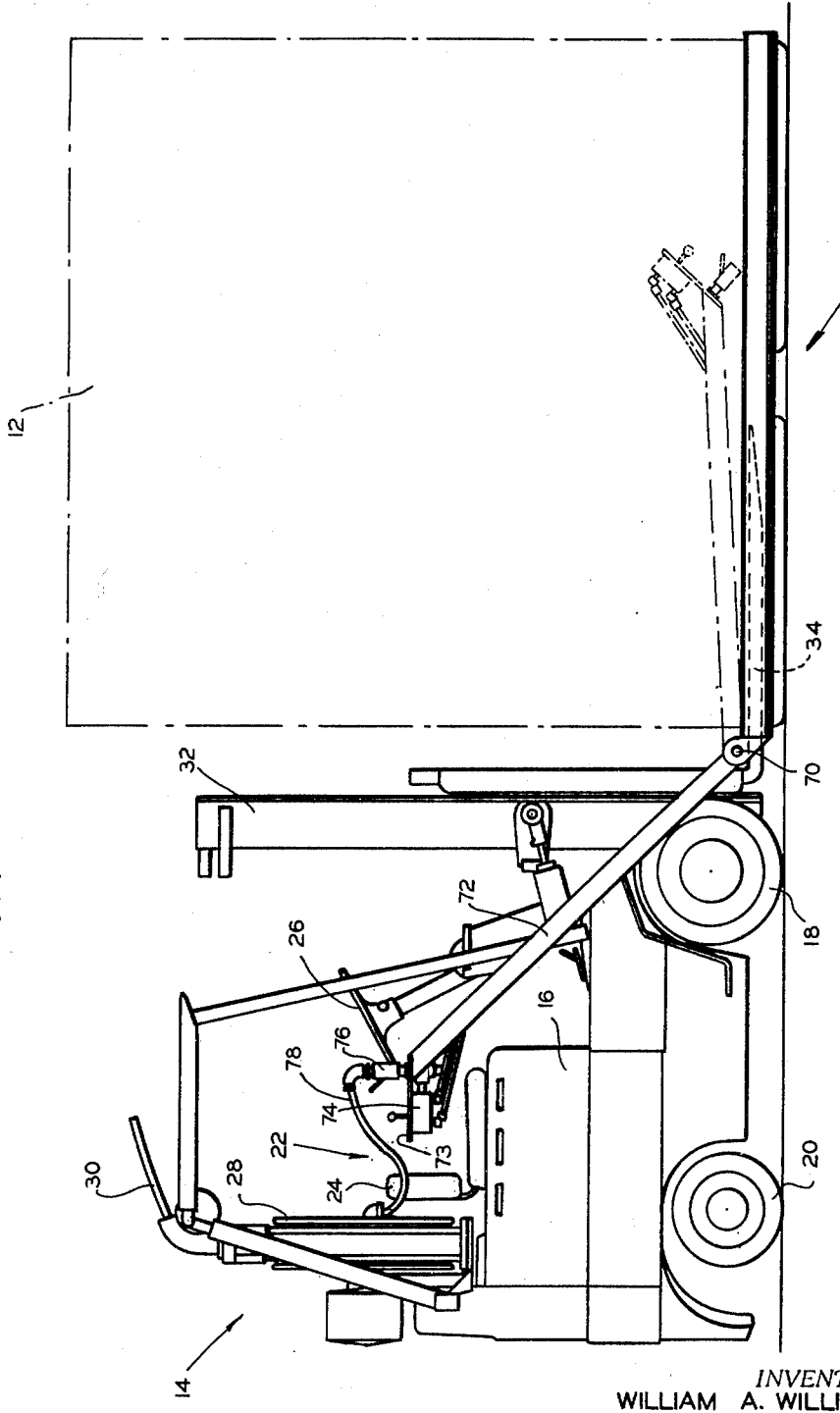
FIGURE 1 is a side elevation of our invention shown in conjunction with an industrial truck.

Referring now to FIGURES 1, 2 and 3, the reference numeral 10 denotes generally a container handling pallet which is adapted to engage and transport a container 12 which may be, by way of example, 8 feet wide and 20 feet long. Pallet 10 is engageable by a conventional fork lift truck 14 which provides the motive force for moving pallet 10 from place to place when transporting container 12.

Lift truck 14 includes a body 16 which is supported by a pair of drive wheels 18, only one of which is shown, and a pair of steer wheels 20, only one of which is shown. Located on body 16 is an operator's station 22 at which seat 24 is located, together with the necessary controls such as steering control wheel 26. Mounted on body 16 is a reel 28 which pays out and takes up an air supply hose 30 which is connectable to the suitable source of pressurized air such as is available in a building or ship. Carried by lift truck 14 at the front thereof is a collapsible lift upright 32 to which a pair of fork arms 34 are connected. Fork arms 34 are insertable in pockets in pallet 10 and are connectable thereto by means of pins or bolts.

Pallet 10 includes a support frame 36 to the underside of which six air pads 38, 40, 42, 44, 46 and 48 are connected in generally rectangular relation to each other. All of the air pads are substantially identical, and so only pad 38 will be described in any detail. Air pad 38 includes a rigid plate 50 which is adapted to be fixed to frame 36 by means of strips 52 and 54 which are held in place by machine screws 56 and 58, respectively. A generally oblong-shaped flexible diaphragm 60 is hermetically attached at the outer periphery thereof to plate 50 and is attached at the center thereof to plate 50 by an assembly 62. Diaphragm 60 defines with plate 50 a chamber 64 to which pressurized air may be supplied through an inlet port 66. Diaphragm 60 also has a plurality of openings 68 therein located near the center thereof so that pressurized air supplied to chamber 64 may escape therefrom and pass radially outwardly underneath pad 38 to provide an air film between the pad and the supporting surface which greatly reduces the coefficient of friction between pad 38 and the supporting surface. A more detailed description of such air pads may be found in U.S. Patent No. 3,321,038.

Referring now also to FIGURE 4, it will be seen that pivotally connected to frame 36 at 70 is an upwardly and rearwardly extending support arm 72 at the upper end of which a plate 73 is connected. Mounted on plate 73 is a flow control valve 74 and an on-off valve 76 which is connected by means of a hose 78 to a swivel joint at the center of reel 28 which connects with hose 30 so that pressurized air from an outside source is supplied to on-off valve 76.

Figure 5:
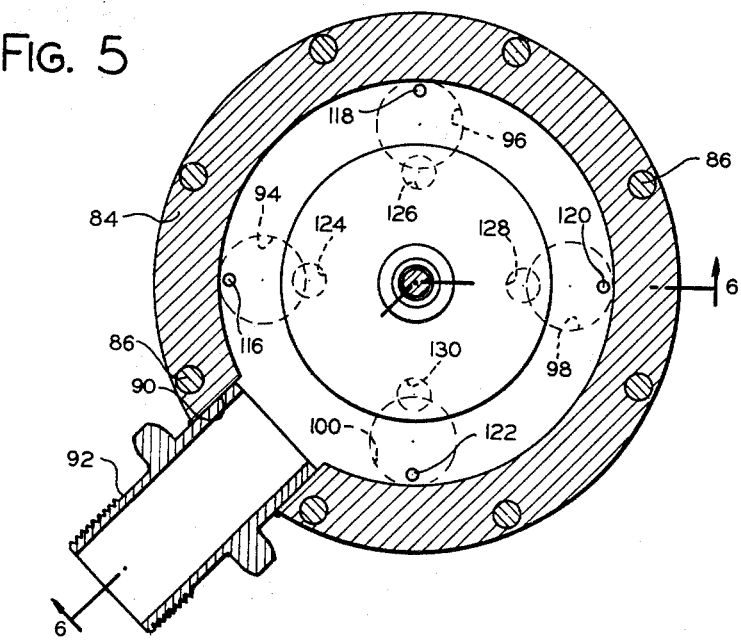
FIGURE 5 is a cross section taken along the line 5—5 of FIGURE 6.
Figure 6:
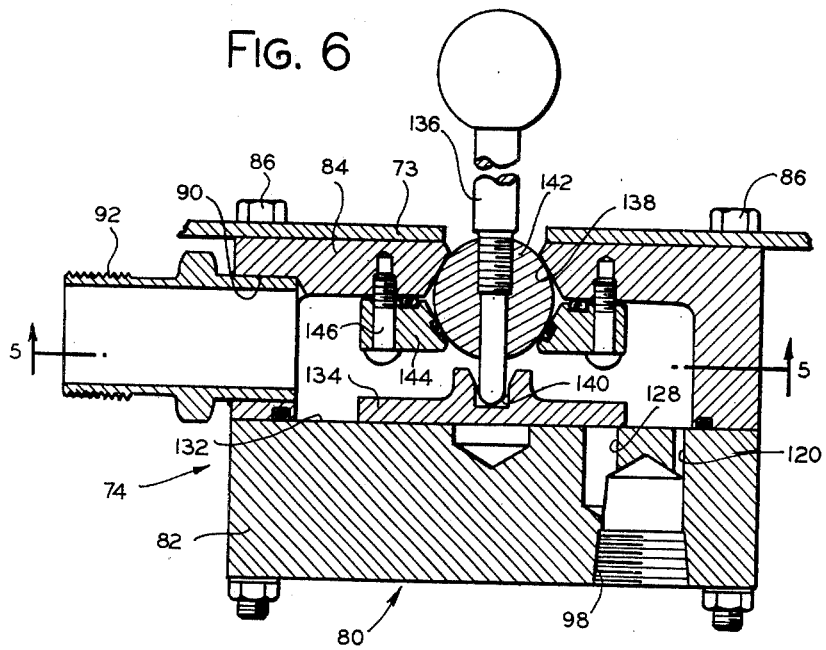
FIGURE 6 is a cross section taken along the line 6—6 of FIGURE 5.

Referring now also to FIGURES 5 and 6, valve 74 includes a body 80 having a base portion 82 and a dish-shaped portion 84 connected to base 82 by a plurality nut and bolt assemblies 86. Portions 82 and 84 define a chamber 88 with which an inlet port 90 communicates, inlet port 90 being connected to on-off valve 76, and hence the source of pressurized fluid, by means of a connector 92. Located in base portion 82 are four outlet ports 94, 96, 98 and 100 which are connected to the corner ones of the air pads as will be explained next. Outlet port 94 is in fluid communication with the chamber of pad 44 via a conduit 102 and port 96 is in fluid communication with the chamber 64 of pad 38 via a conduit 104. Similarly, port 98 is in fluid communication with the chamber of pad 42 via a conduit 106 and port 100 is in fluid communication with the chamber of pad 48 via a conduit 108. At this point it will be noted that the chambers of pads 40 and 46 are connected in fluid communication with valve 76 via connector 92, a connector 110, conduit 112 and branch conduit 114.

Returning now to the description of valve 74, each port 94, 96, 98 and 100 is connected to chamber 88 by means of relatively small fluid passages 116, 118, 120 and 122 which are located substantially equidistantly from each other. Also, port 94, 96, 98 and 100 are connected to chamber 88 by relatively large fluid passages 124, 126, 128 and 130 which are located radially inwardly of fluid passages 116, 118, 120 and 122 and are disposed substantially equidistantly from each other.

Located in chamber 88 and disposed in sealing relationhip with the inner surface 132 of base portion 82 is a enerally circular plate or sealing member 134 which is iovable omnidirectionally away from the centered position shown in FIGURES 5 and 6 in which passages 124, 26, 128 and 130 are covered to a position in which ither one of passages 124, 126, 128 and 130 is uncovered r two adjacent ones of these passages are uncovered. 'hus, there is at all times a minimum fluid flow from hamber 88 to ports 94, 96, 98 and 100 when member 34 is located in the position shown, and by moving member 134 away from its centered position the fluid flow ) either one or two adjacent ones of ports 94, 96, 98 and 00 can be increased by uncovering the appropriate one r ones of passages 124, 126, 128 and 130.

Movement of member 134 is controlled by a control od 136 which extends through an opening 138 in body ortion 84 and engages a shallow bore 140 in member 34 so that limited universal pivotal movement is provided between rod 136 and member 134. Also, rod 136 as a ball 142 connected thereto which is disposed between opening 138 and a ring 144 attached to body portion 84 by machine screws 146 so that limited universal ivotal movement between rod 136 and body portion 84 ; provided.

In order to enable persons to better understand our ivention, we will briefly explain the operation of it. It 'ill be assumed that pallet 10 is connected to the fork rms 34 of a lift truck 14 and that it is desired to engage nd transport a container 12. Initially, valve 76 is in the ff position so that no pressurized air is being supplied ) any of the pads of pallet 10. The pallet is held slightly ff the floor or other supporting surface by the fork arms 4 of lift truck 14 and lift truck 14 is driven by the oprator so that pallet 10 is disposed beneath container 12, s shown in FIGURE 1. The operator then actuates valve 6 to the on position so that pressurized air is supplied to alve 74 and directly to pads 40 and 46. Assuming that alve 74 is initially in its centered position pressurized ir is distributed evenly to pads 38, 42, 44 and 48. Supplying pressurized air to the pads causes them to inflate iereby lifting frame 36 slightly so that container 12 is aised clear of whatever supporting members it was initially resting upon. Pressurized air which is being supplied ) the pads also is escaping outwardly from under the ads so that an air film is formed between the pads and ie supporting floor or surface, thereby greatly reducing ie coefficient of friction between the pads and the floor o that a very heavy load carried on pallet 10 can be ioved with a minimum amount of tractive effort supplied y lift truck 14. At this point it should be added that lift uck 14 is not operating to lift container 12 at all, but /ill serve merely to push or pull pallet 10 and container 2 horizontally along the floor or supporting surface.

If the loading of container 12 is such that the center f gravity of its is located off-center, then there will be tendency for pallet 10 to tip. This is objectionable beause the pads which have the lighter loading thereon /ill offer less resistance to air flowing out from therender, and in extreme cases the flow may become so reat that no air will flow out of one or more of the other pads so that there is no longer an air film between one of the pads and the supporting floor with the result that the pallet and container thereon cannot be moved or be slid along the floor. In order to compensate for off-center loading of the container the air flow to the corner pads of pallet 10 can be varied so that the pads which have to carry a greater share of the load of container 12 can be supplied with a greater air flow which in turn counteracts the tendency of pallet 10 and container 12 to tip and maintains an air film between all of the pads and the supporting floor. For example, if container 12 is loaded so that a greater load is imposed upon pads 38, 40 and 42, the operator manipulates rod 136 to move plate 134 of valve 74 so that passages 126 and 128 are uncovered to the degree necessary to provide additional fluid flow to pads 38 and 42 to counteract the off-center loading of container 12. Also, by manipulating valve 74 to control air flow to the corner pads an operator can intentionally tip pallet 10 and container 12 in any desired direction.

While we have described only a single embodiment of our invention in the foregoing description, it will be understood that this description is for the purpose of illustration only in that our invention is susceptible to various modifications, changes and rearrangements of structure which still fall within the scope and spirit of our invention. Therefore, the limits of our invention should be determined from the following appended claim.

We claim:

1. For use with a source of pressurized fluid, a material handling device comprising a support frame, six fluid inflatable pads connected to the said frame in generally rectangular relationship relative to each other, valve means for connecting the said pads to the source, the said valve means being operable to vary the flow of fluid to the corner ones of the said pads in order to compensate for off-center loading imposed on the said frame and including a body, a chamber in the said body, an inlet port in the said body which connects the source of pressurized fluid with the said chamber, four outlet ports in the said body, each outlet port connecting with a different one of the said corner pads and having first and second fluid passages connecting the respective outlet port with the said chamber, and a member movable between a first position blocking fluid communication between all of the said second fluid passages and the said chamber and a second position unblocking fluid communication between at least one of the said second fluid passages and the said chamber.

References Cited

UNITED STATES PATENTS 3,251,432  5/1966  Fischer _____ 180—124

LESTER M. SWINGLE, Primary Examiner

D. R. MELTON, Assistant Examiner

U.S. Cl. X.R.

254—93